(12) United States Patent
Kim et al.

(10) Patent No.: US 9,794,881 B2
(45) Date of Patent: Oct. 17, 2017

(54) METHOD AND APPARATUS FOR CONTROLLING APERIODIC TRAFFIC IN ELECTRONIC DEVICE

(71) Applicant: Samsung Electronics Co., Ltd., Suwon-si, Gyeonggi-do (KR)

(72) Inventors: Jin-Hyoung Kim, Seoul (KR); Jin-Ho Lee, Seoul (KR); Young-Ki Hong, Seoul (KR); Sang-Jun Moon, Yongin-si (KR); Yong-Seok Park, Seoul (KR); Kang-Jin Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 14/684,920

(22) Filed: Apr. 13, 2015

(65) Prior Publication Data

US 2015/0296405 A1      Oct. 15, 2015

(30) Foreign Application Priority Data

Apr. 14, 2014   (KR) ..................... 10-2014-0044251

(51) Int. Cl.
*H04L 1/00* (2006.01)
*H04W 52/02* (2009.01)

(52) U.S. Cl.
CPC ......... *H04W 52/0225* (2013.01); *Y02B 60/50* (2013.01)

(58) Field of Classification Search
CPC  H04B 17/00; H04L 1/00; H04L 43/00; H04L 43/50; H04L 12/5693; H04L 2012/5681; H04L 47/50; H04L 49/90; H04W 52/02; H04W 52/0203

USPC ......................................... 370/311, 242, 412
See application file for complete search history.

(56) References Cited

U.S. PATENT DOCUMENTS

| 2013/0215850 A1* | 8/2013 | Zakrzewski ...... H04W 52/0261 370/329 |
|---|---|---|
| 2014/0198700 A1 | 7/2014 | Kim et al. |
| 2014/0281038 A1 | 9/2014 | Hong et al. |
| 2014/0304700 A1 | 10/2014 | Kim et al. |
| 2014/0368332 A1 | 12/2014 | Hong et al. |

FOREIGN PATENT DOCUMENTS

| KR | 10-2014-0093088 A | 7/2014 |
|---|---|---|
| KR | 10-2014-0113810 A | 9/2014 |
| KR | 10-2014-0122072 | 10/2014 |
| KR | 10-2014-0145972 | 12/2014 |

* cited by examiner

*Primary Examiner* — Dady Chery
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as a smart home, a smart building, a smart city, a smart car, a connected car, healthcare, digital education, smart retail, security and safety services. A method and an apparatus for controlling aperiodic traffic in an electronic device are provided. The method includes determining a delay allowed time for first traffic associated with the first application based on a prediction time of generation of second traffic associated with a second application and processing the first traffic associated with the first application based on the delay allowed time.

20 Claims, 7 Drawing Sheets

METHOD AND APPARATUS FOR CONTROLLING APERIODIC TRAFFIC IN ELECTRONIC DEVICE

CROSS-REFERENCE TO RELATED APPLICATION(S)

This application claims the benefit under 35 U.S.C. §119(a) of a Korean patent application filed on Apr. 14, 2014 in the Korean Intellectual Property Office and assigned Serial number 10-2014-0044251, the entire disclosure of which is hereby incorporated by reference.

TECHNICAL FIELD

The present disclosure relates to a method and an apparatus for controlling traffic in an electronic device.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

As the amount of various portable electronic devices used increases, a problem caused by a restricted battery capacity is suddenly increasing. More particularly, currently, as electronic devices have many applications, traffic is often generated by many applications, causing a problem in which power of charged batteries are quickly consumed. For instance, for the sake of maintenance of connection with a server, the respective applications of the electronic device can generate traffic by periods, or can generate traffic in response to a user request or server request.

Thus, there is a need to provide a technology capable of making efficient use of a restricted battery capacity by controlling traffic generated by many applications in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for controlling a time point of processing of aperiodic traffic so as to decrease electric current consumption while decreasing a signal load of a network access in an electronic device.

Another aspect of the present disclosure is to provide a method and an apparatus for delaying processing of aperiodic traffic generated by an application and processing the aperiodic traffic together with periodic traffic in an electronic device.

Another aspect of the present disclosure is to provide a method and an apparatus for, when aperiodic traffic is generated by a specific application, delaying processing of the aperiodic traffic within a range in which a timeout or error does not occur in the corresponding application in an electronic device.

Another aspect of the present disclosure is to provide a method and an apparatus for setting a traffic delay allowed time not causing a timeout or error by application in an electronic device.

In accordance with an aspect of the present disclosure, a method for controlling traffic in an electronic device is provided. The method includes determining a delay allowed time for a first traffic associated with a first application based on a prediction time of generation of a second traffic associated with a second application and processing the first traffic associated with the first application based on the delay allowed time.

In accordance with another aspect of the present disclosure, an apparatus for controlling traffic in an electronic device is provided. The apparatus includes a processor configured to determine a delay allowed time for first traffic associated with the first application based on a prediction time of generation of second traffic associated with a second application, and to control the processing of the first traffic associated with the first application based on the delay allowed time and a transceiver configured to process the first traffic associated with the first application by the control of the processor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
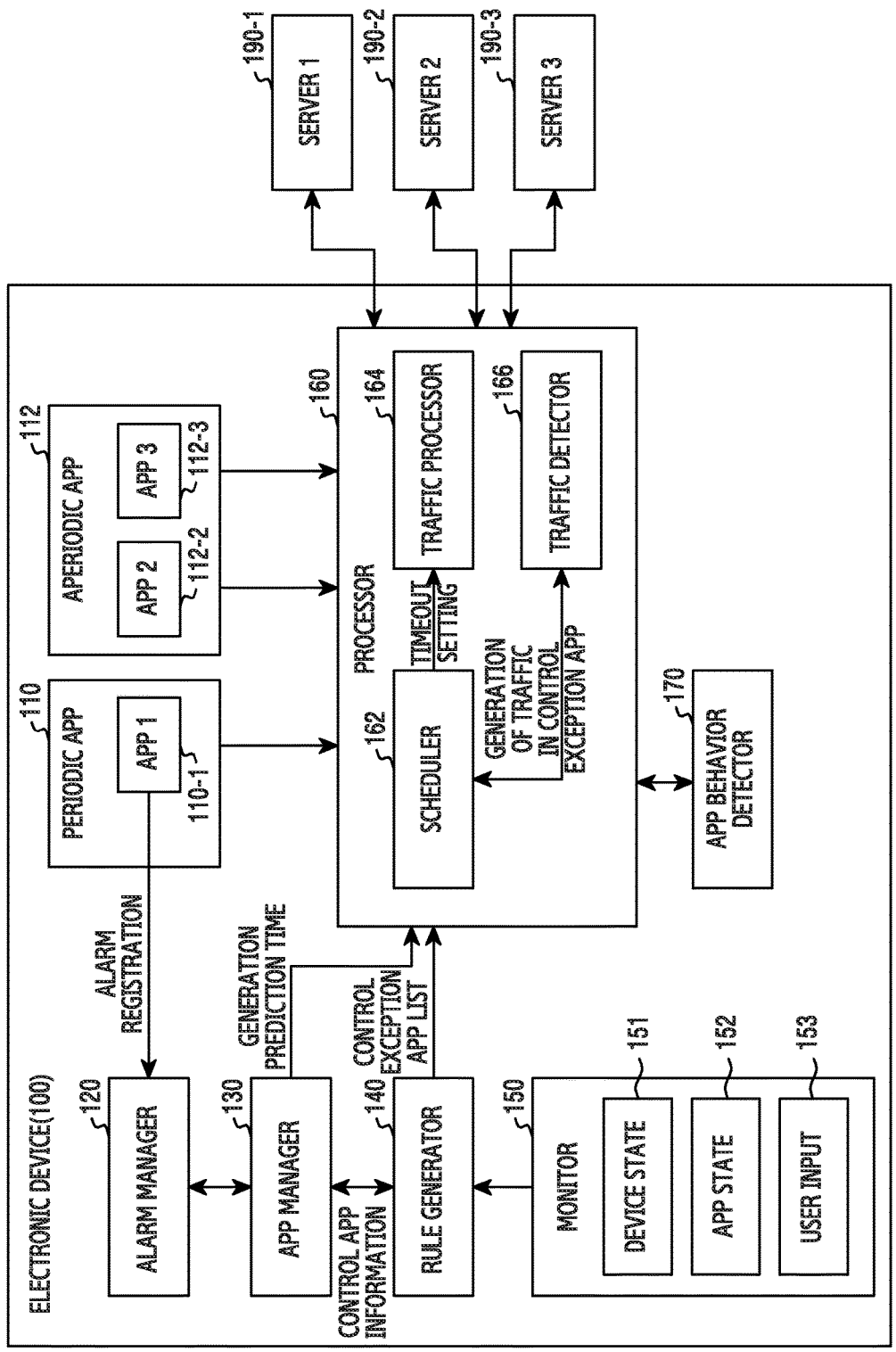
FIG. 1 is a block diagram illustrating a construction of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In various embodiments of the present disclosure, the expressions "have", "can have", "comprise", "can comprise", or the like indicate the existence of disclosed corresponding functions, operations, constituent elements or the like, and do not limit additional one or more functions, operations, constituent elements or the like. In addition, in the various embodiments of the present disclosure, the terms "comprise", "have" or the like indicate the existence of a feature stated in the specification, a number, an operation, a constituent element, a component, or a combination thereof. Accordingly, it should be understood that these terms do not previously exclude a possibility of existence or supplement of one or more other features, numbers, operations, constituent elements, components, or combinations thereof.

In the various embodiments of the present disclosure, the expressions "A or B", "at least one of A or/and B" or the like include any and all combinations of words enumerated together. For example, the expression "A or B" or "at least one of A or/and B" each may include A or may include B or may include all A and B.

In the various embodiments of the present disclosure, the expressions "1st", "2nd", "first", "second" or the like may modify various constituent elements according to the various embodiments of the present disclosure, but do not limit the corresponding constituent elements. For example, the expressions do not limit the order, importance and/or the like of the corresponding constituent elements. The expressions may be used to distinguish one constituent element from another constituent element. For example, a 1st user device and a 2nd user device represent different user devices. For example, a 1st constituent element may be named as a 2nd constituent element without departing from the scope of right of the various embodiments of the present disclosure. Likely, even a 2nd constituent element may be named as a 1st constituent element.

When it is mentioned that any constituent element is "connected" or "accessed" to another constituent element, the any constituent element may be directly connected or accessed to the another constituent element, but it should be understood that new other constituent element may also exist between the any constituent element and the another constituent element. In contrast, when it is mentioned that any constituent element is "directly connected" or "directly accessed" to another constituent element, it should be understood that no new other constituent element exists between the any constituent element and the another constituent element.

The expression "configured (or set) to" used in the present document may be used interchangeably with, for example, "suitable for", "having the capacity to", "designed to", "adapted to", "made to", or "capable of", in accordance to circumstances. The term "configured (or set) to" may not necessarily mean only "specifically designed to" in a hardware manner. Instead, in some circumstances, the expression "device configured to" may mean that the device is "capable of ~" together with other devices or components. For example, the clause "processor configured (or set) to perform A, B, and C" may mean an exclusive processor (e.g., an embedded processor) for performing a corresponding operation, or a generic-purpose processor (e.g., a Central Processing Unit (CPU) or an application processor) executing one or more software programs stored in a memory device, thereby being capable of performing corresponding operations.

The terms used in the various embodiments of the present disclosure are used for just describing specific embodiments, and do not intend to limit the various embodiments of the present disclosure.

Unless defined otherwise, all the terms used herein including the technological or scientific terms have the same meaning as those commonly understood by a person having ordinary knowledge in the art which various embodiments of the present disclosure belong to. The terms as defined in a general dictionary should be interpreted as the same meanings as the contextual meanings of a related technology, and are not interpreted as ideal or excessively formal meanings unless defined clearly in various embodiments of the present disclosure.

Generally, for the sake of maintenance of connection with a server, respective applications provided in an electronic device may generate traffic by periods, or generate traffic in response to a user request or server request. During traffic generation, the electronic device operates in an active state and consumes high power. More particularly, the electronic device of the active state does not straight convert into an idle state at a time point of end of traffic generation, and maintains the active state during a certain time while determining if traffic is again generated. If no traffic is generated during the certain time, the electronic device converts into the idle state and consumes low power. For instance, the electronic device of the active state consumes high power during a certain time despite a no-traffic state. The power consumed unnecessarily despite the no-traffic state in the electronic device as above is dubbed tail-end energy. If traffic is often generated by many applications in the electronic device, the tail-end energy may be often generated, increasing unnecessary electric energy consumption. In addition, if traffic is generated in order by many applications in the electronic device, that is, if traffic is generated by a specific application and soon traffics are generated by other applications, consumed electric energy may increase because the electronic device maintains the active state for long time.

Accordingly, there is provided a method and an apparatus for controlling a time point of processing of aperiodic traffic for a decrease of electric current consumption and a decrease of a signal load of a network access in an electronic device. In the following description, the electronic device is a meaning including a mobile communication terminal, a smart phone, a tablet Personal Computer (PC), a digital camera, a Motion Picture Experts Group (MPEG-1 or MPEG-2) Audio Layer 3 (MP3) player, a navigator, a laptop, a netbook and the like. In addition, in the following description, traffic indicates all data and signals generated to transmit/receive contents or control signal of an application (App) provided in the electronic device. Traffic processing may be a meaning including transmission and/or reception of the contents or control signal.

FIG. 1 is a block diagram illustrating a construction of an electronic device according to an embodiment of the present disclosure.

Figure 2A:
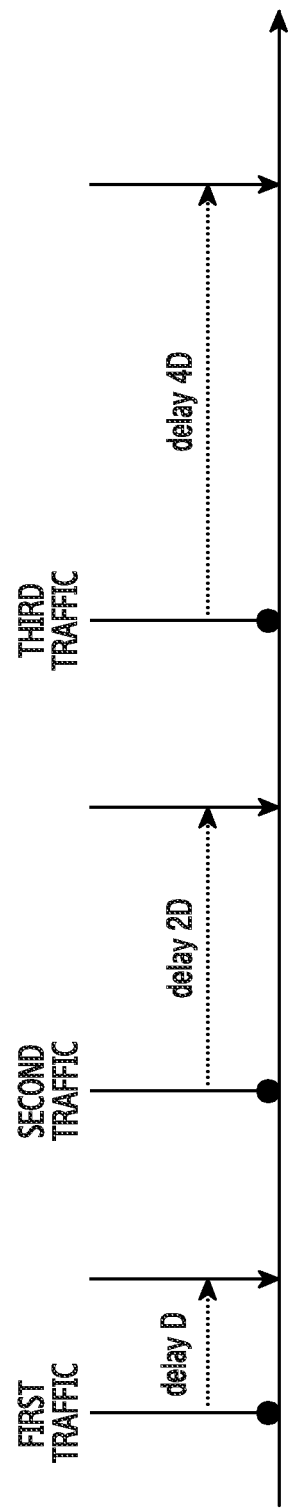
FIGS. 2A and 2B illustrate setting a delay allowed time of traffic in an electronic device according to various embodiments of the present disclosure.
Figure 2B:
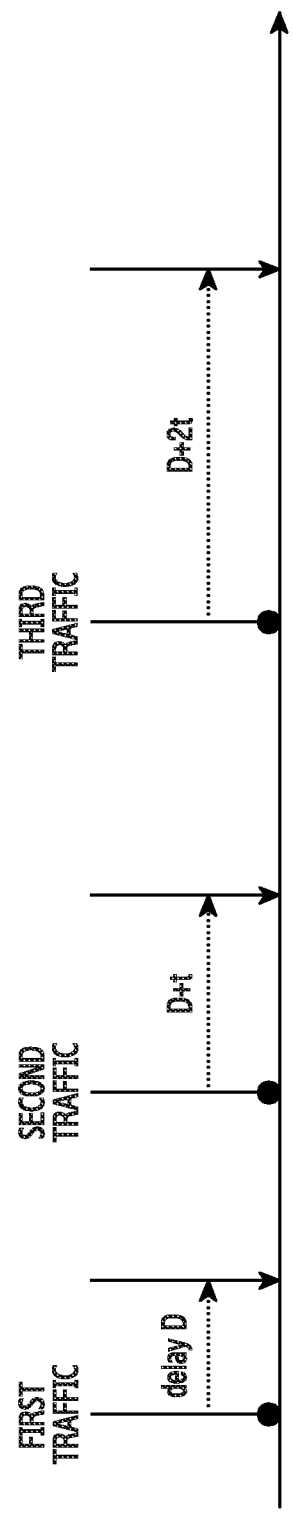

FIGS. 2A and 2B illustrate setting a delay allowed time of traffic in an electronic device according to various embodiments of the present disclosure.

Referring to FIG. 1, an electronic device 100 may include a periodic App 110, an aperiodic App 112, an alarm manager 120, an App manager 130, a rule generator 140, a monitor 150, a processor 160, and an App behavior detector 170.

The periodic App 100 includes at least one App 110-1 generating traffic every previously set period. The periodic App 110 registers an alarm corresponding to the previously set traffic generation period to the alarm manager 120, and generates traffic to the processor 160 every previously set traffic generation period. For example, the periodic App 110 may include an App providing an instant messenger service of periodically generating traffic for the sake of maintenance of connection with a corresponding server 190-1 to 190-3.

The aperiodic App 112 includes the remnant Apps 112-2 and 112-3 excepting the periodic App 110. For instance, the aperiodic App 112 generates traffic to the processor 160 based on an event occurrence time point. The aperiodic App 112 does not register an alarm to the alarm manager 120. For example, the aperiodic App 112 may include an App providing services, such as an electronic mail (e-mail), podcast download, contents upload, contents download, software update, and the like in which a user does not feel inconvenience although traffic is processed a few seconds or a few hours after a time point of occurrence of an event needing traffic processing.

The alarm manager 120 registers and manages an alarm indicating a time point of generation of traffic of the periodic App 110, and provides an alarm generation time point to the App manager 130.

Based on alarm information provided from the alarm manager 120, the App manager 130 synchronizes the time point of generation of traffic of the periodic App 110, and minimizes that different Apps belonging to the periodic App 110 generate traffic at different time points. For example, the App manager 130 may receive alarm information indicating a time point of generation of traffic of a first periodic App and alarm information indicating a time point of generation of traffic of a second periodic App from the alarm manager 120, and synchronize the time point of generation of traffic of the first periodic App and the time point of generation of traffic of the second periodic App.

In addition, based on the alarm information and synchronization result provided from the alarm manager 120, the App manager 130 determines a prediction time point of generation of traffic of the periodic App 110, and provides the determined prediction time point of generation of traffic to a scheduler 162 of the processor 160.

In addition, the App manager 130 provides the rule generator 140 with information about the periodic App 110 whose alarm information is provided from the alarm manager 120. For example, the App manager 130 provides the rule generator 140 with identification information of the periodic App 110 whose alarm has been registered to the alarm manager 120.

Based on the periodic App identification information provided from the App manager 130 and the monitoring result provided from the monitor 150, the rule generator 140 generates a traffic control exception App list, and provides the generated traffic control exception App list to the scheduler 162 included in the processor 160. For example, the rule generator 140 may generate a traffic control exception App list including periodic App identification information provided from the App manager 130, such that traffic of a periodic App is not delayed.

In addition, the rule generator 140 may receive information related to a device state, an App state, and a user input from the monitor 150 and, based on the received information, update the traffic control exception App list, or determine a traffic control allowance state indicating whether to perform a traffic control operation for an App. Here, the device state related information may include a network connection state of the electronic device 100, a type of a network being connecting, battery charging or non-charging, battery level information, and the like.

In addition, the App state related information may include information about an App being operating in a foreground, information about an App being operating in a background, or information representing if each App is operating in the foreground or is operating in the background.

In addition, the user input related information may include information about an App for which a user input is generated, and information of a time point of generation of the user input to the App.

In accordance with an embodiment of the present disclosure, if a user input is currently in progress for an aperiodic App not corresponding to a periodic App, the rule generator 140 may include the corresponding aperiodic App in a traffic control exception App list. In accordance with an embodiment of the present disclosure, in order for traffic generated by a user input to an App (for instance, traffic generated in response to a user's touch or button input to the App) not to be delayed, the rule generator 140 may include the corresponding App in the traffic control exception App list. In accordance with an embodiment of the present disclosure, if an aperiodic App not corresponding to a periodic App is operating in the foreground, the rule generator 140 may include in the traffic control exception App list the aperiodic App being operating in the foreground. In accordance with an embodiment of the present disclosure, if a battery is being currently charged, the rule generator 140 may recognize that the rule generator 140 is in a state where an electric current is sufficient, and determine not to perform a traffic control operation for an App. In contrast, if a current battery level is equal to or is less than a threshold value, the rule generator 140 may recognize that the rule generator 140 is in a state where an electric current is deficient, and determine to perform a traffic control operation for an App included in the traffic control exception App list. In accordance with an embodiment of the present disclosure, if the electronic device 100 is under connection to a network of a specific type (e.g., a $3^{rd}$-Generation (3G) system), the rule generator 140 may determine to perform a traffic control operation for an App not included in the traffic control exception App list. In accordance with an embodiment of the present disclosure, the rule generator 140 may include an App needing a real-time service, such as a multimedia streaming service in the traffic control exception App list, such that corresponding traffic is not delayed.

To determine update of the traffic control exception App list update and/or execution or non-execution of a traffic control exception operation, the monitor 150 monitors a device state 151, an App state 152, and a user input 153 as aforementioned, and provides monitored information to the rule generator 140.

Based on a Hyper Text Transfer Protocol (HTTP) protocol, the processor 160 transmits/receives and processes traffic generated by an App provided in the electronic device 100. For example, the processor 160 performs session connection with the server 190-1 to 190-3 corresponding to an App, and transmits/receives and processes traffic of the corresponding App through the connected session. In accordance with an embodiment of the present disclosure, the processor 160 controls and processes a function for setting a delay allowed time for each aperiodic App, and setting a timeout value for a session of the aperiodic App by the set delay allowed time, and delaying and processing traffic generated by the aperiodic App based on the corresponding delay allowed time. For the sake of control of traffic of the aperiodic App, the processor 160 may include the scheduler 162, a per-session traffic processor 164, and a traffic detector 166 as below.

The traffic detector 166 detects traffic generated and processed (e.g., transmitted and/or received) by at least one App provided in the electronic device 100. The traffic detector 166 determines if traffic is generated and processed by an App included in a traffic control exception App list, based on the traffic control exception App list. If processing of the traffic generated by the App included in the traffic control exception App list is detected, the traffic detector 166 notifies the scheduler 162 that the processing of the traffic of the traffic control exception App has been detected.

The scheduler 162 controls a time point of processing of traffic generated by an aperiodic App. The scheduler 162 schedules a time point of processing of traffic generated by an App not included in a traffic control exception App list, (i.e., the aperiodic App 112) among Apps provided in the electronic device 100. For instance, the scheduler 162 determines a traffic control allowance state of an App from the rule generator 140. If traffic control is allowed, the scheduler 162 determines the aperiodic App 112 not included in the traffic control exception App list based on the traffic control exception App list provided from the rule generator 140.

The scheduler 162 determines a delay allowed time for the aperiodic App 112 based on a prediction time of generation of traffic of a periodic App provided from the App manager 130 and a default session timeout value of an Operating System (OS). The scheduler 162 provides the determined delay allowed time to the per-session traffic processor 164 and sets the delay allowed time as a timeout value for a network connection session of the corresponding aperiodic App 112. Here, the scheduler 162 sets an initial delay allowance value based on the prediction time of generation of traffic of the periodic App and the default session timeout value of the OS, and stepwise increases the delay allowed time in compliance with a previously set rule while determining the delay allowed time allowed for the corresponding App.

Referring to FIGS. 2A and 2B, for instance, whenever traffic is processed responsive to a traffic processing request of a specific aperiodic App 112, the scheduler 162 may use a binary exponential way of increasing a delay allowed time of the corresponding aperiodic App 112 in a multiple form as illustrated in FIG. 2A or uses a way of increasing the delay allowed time of the corresponding aperiodic App 112 as much as a previously set time (t) as illustrated in FIG. 2B, to determine an optimal delay allowed time causing no timeout or error in the corresponding aperiodic App 112. For example, when traffic processing is requested from the specific aperiodic App 112 not included in the traffic control exception App list, the scheduler 162 determines a delay allowed time for the corresponding aperiodic App 112, and delays the traffic processing requested from the aperiodic App 112 during the determined delay allowed time. At this time, when traffic is generated by a periodic App included in a traffic control exception App list in course of delaying the processing of traffic of the corresponding aperiodic App 112 during the delay allowed time, the scheduler 162 controls to process the delayed traffic of the aperiodic App 112 together with the traffic of the periodic App.

In contrast, when traffic of the periodic App is not generated till the lapse of the delay allowed time, if the delay allowed time lapses, the scheduler 162 may process the delayed traffic of the aperiodic App 112. While delaying the traffic of the aperiodic App 112 during the delay allowed time and processing the delayed traffic as above, the scheduler 162 determines if an App error takes place. If the App error does not take place, the scheduler 162 may increase the delay allowed time in accordance with a previously set way. If the App error takes place, the scheduler 162 may determine a delay allowed time during which no App error takes place through a way of decreasing the delay allowed time.

Meantime, if it is determined that traffic control is not allowed as a result of analyzing a traffic control allowance state of an App provided from the rule generator 140, the scheduler 162 does not perform a traffic control operation for all Apps.

The traffic processor 164 sets a session timeout of an HTTP or OS socket for network connection of an aperiodic App in accordance with the control of the scheduler 162, and processes traffic of the corresponding aperiodic App based on the session timeout value. At this time, a session of each App may be distinguished by a Domain Name System/Internet Protocol (DNS/IP) address and a port number for connection with a server. Under the control of the scheduler 162, the per-session traffic processor 164 may, without straight processing traffic requested by an aperiodic App, delay the requested traffic during a delay allowed time. Under the control of the scheduler 162, the per-session traffic processor 164 may process the delayed traffic of the aperiodic App, together, at the time of processing traffic of a periodic App. In addition, under the control of the scheduler 162, the per-session traffic processor 164 may process traffic of an aperiodic App whose delay allowed time expires.

The App behavior detector 170 detects if a timeout or error occurs in an App provided in the electronic device 100. When the timeout or error occurs, the App behavior detector 170 notifies the scheduler 162 that the error of the App occurs. For instance, the App behavior detector 170 determines if a timeout or error takes place in an aperiodic App due to delaying processing of traffic of the corresponding aperiodic App in the processor 160. When the end of an session of a corresponding aperiodic App, the end of a corresponding socket, the generation of a interrupt, the generation of input/output exception, the occurrence of an error event of the corresponding aperiodic App in a User Interface (UI) framework, or the like is detected in course of delaying the processing of the traffic of the aperiodic App in the processor 160, the App behavior detector 170 determines that an error occurs in the aperiodic App.

In accordance with various embodiments of the present disclosure, the electronic device 100 of FIG. 1 may include at least one processor. The at least one processor may be configured to execute a function executed by at least one of the periodic App 110, the aperiodic App 112, the alarm manager 120, the App manager 130, the rule generator 140, the monitor 150, the processor 160, and the App behavior detector 170. Additionally, the electronic device 100 may include a transceiver. The transceiver may transmit traffic to at least one server 190-1 to 190-3 under the control of the at least one processor or the processor 160.

Figure 3:
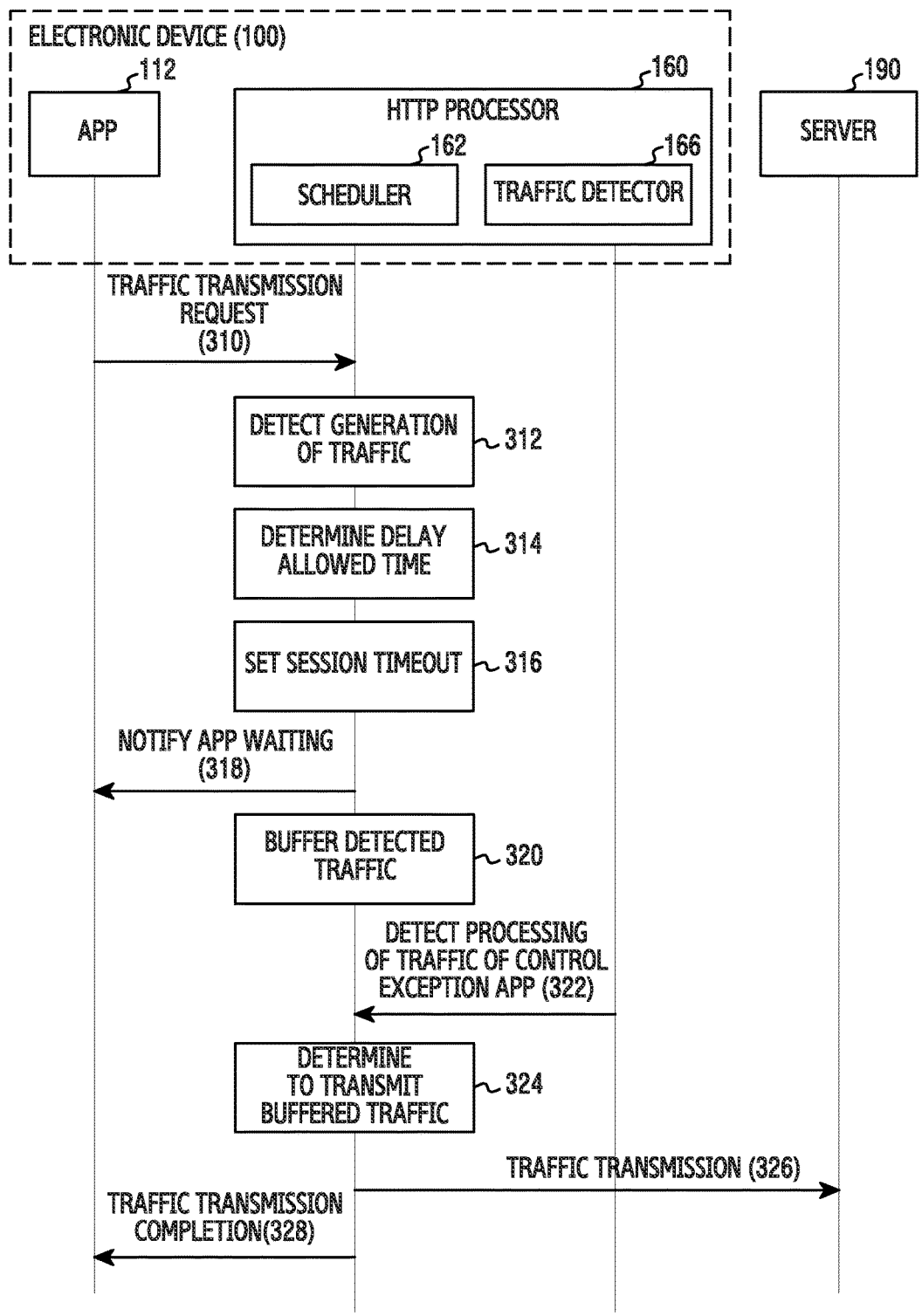
FIG. 3 is a ladder diagram illustrating a procedure of delaying processing of aperiodic traffic in an electronic device according to an embodiment of the present disclosure.

FIG. 3 is a ladder diagram illustrating a procedure of delaying processing of aperiodic traffic in an electronic device according to an embodiment of the present disclosure.

Referring to FIG. 3, in operation 310, an App 2 112-2 provided in the electronic device 100 transmits a traffic transmission request to the processor 160 based on an event by a previously set rule or user input. Here, in accordance with an embodiment of the present disclosure, it is assumed that the App 2 112-2 is an aperiodic App 112 not included in a traffic control exception App list.

In operation 312, the processor 160 detects generation of traffic in response to the traffic transmission request. At this time, the processor 160 determines if the corresponding traffic is traffic generated by an App included in the traffic control exception App list or is traffic generated by an App not included in the traffic control exception App list, through the scheduler 162. Here, the processor 160 may determine that the App 2 112-2 is the aperiodic App 112 not included in the traffic control exception App list.

In operation 314, the processor 160 determines a delay allowed time for the traffic of the App 2 112-2 through the scheduler 162. At this time, the scheduler 162 may determine the delay allowed time based on a prediction time of generation of traffic of an App included in the traffic control exception App list and a default session timeout value of an OS. If the delay allowed time is previously set for the App 2 112-2, the scheduler 162 may update the previous delay allowed time in a previously set way as illustrated in FIG. 2A or FIG. 2B.

In operation 316, the processor 160 sets a session timeout value to a session of communication between the App 2 112-2 and a server, based on the delay allowed time. Thereafter, in operation 318, the processor 160 notifies the App 2 112-2 that the traffic is not processed and is in a waiting state. In operation 320, the processor 160 buffers the traffic requested for transmission from the App 2 112-2 and delays processing of the traffic. Here, the processor 160 may buffer the traffic requested for transmission from the App 2 112-2, as much as the delay allowed time.

In operation 322, while delaying the processing of the traffic of the App 2 112-2 during the delay allowed time, the processor 160 may detect that traffic is generated and processed by an App included in the traffic control exception App list through the traffic detector 180. In operation 324, the processor 160 detecting the processing of the traffic of the App included in the traffic control exception App list determines to transmit the buffered traffic of the App 2 112-2. In operation 326, the processor 160 transmits the traffic to the server 190. For example, because the processing of the periodic traffic or the control exception traffic is generated in the electronic device 100, the processor 160 may determine to transmit the traffic of the App 2 112-2, although a delay allowed time from a time point of buffering the traffic of the App 2 112-2 does not expire. As such, the processor 160 controls to process the traffic of the App 2 112-2 together with the periodic traffic or the control exception traffic, thereby being capable of obtaining an effect of decreasing electric current consumption of the electronic device 100 while decreasing a signal load of a network.

Thereafter, in operation 328, the processor 160 notifies the App 2 112-2 that the traffic transmission is completed.

Figure 4:
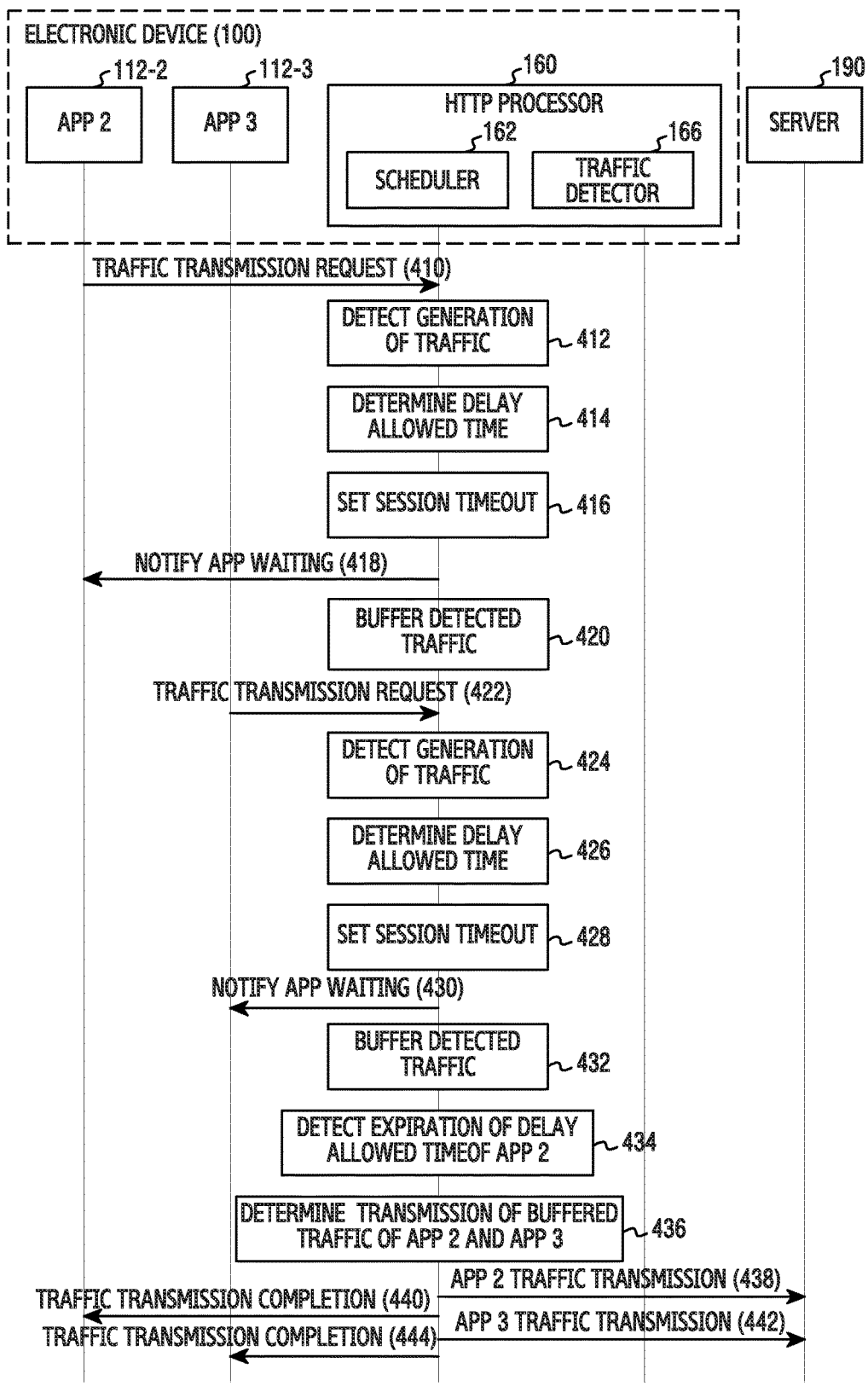
FIG. 4 is a ladder diagram illustrating a procedure of delaying processing of aperiodic traffic in an electronic device according to an embodiment of the present disclosure.

FIG. 4 is a ladder diagram illustrating a procedure of delaying processing of aperiodic traffic in an electronic device according to an embodiment of the present disclosure.

Referring to FIG. 4, in operation 410, an App 2 112-2 provided in the electronic device 100 transmits a traffic transmission request to the processor 160 based on an event by a previously set rule or user input. Here, in accordance with an embodiment of the present disclosure, it is assumed that the App 2 112-2 is an aperiodic App 112 not included in a traffic control exception App list.

In operation 412, the processor 160 detects generation of traffic in response to the traffic transmission request. At this time, the processor 160 determines if the corresponding traffic is traffic generated by an App included in the traffic control exception App list or is traffic generated by an App not included in the traffic control exception App list, through the scheduler 162. Here, the processor 160 may determine that the App 2 112-2 is the aperiodic App 112 not included in the traffic control exception App list.

In operation 414, the processor 160 determines a delay allowed time for the traffic of the App 2 112-2 through the scheduler 162. At this time, the scheduler 162 may determine the delay allowed time based on a prediction time of generation of traffic of an App included in the traffic control exception App list and a default session timeout value of an OS. If the delay allowed time is previously set for the App 2 112-2, the scheduler 162 may update the previous delay allowed time in a previously set way as illustrated in FIG. 2A or FIG. 2B.

In operation 416, the processor 160 sets a session timeout value to a session of communication between the App 2 112-2 and a server, based on the delay allowed time. Thereafter, in operation 418, the processor 160 notifies the App 2 112-2 that the traffic is not processed and is in a waiting state. In operation 420, the processor 160 buffers the traffic requested for transmission from the App 2 112-2 and delays processing of the traffic. Here, the processor 160 may buffer the traffic requested for transmission from the App 2 112-2, as much as the delay allowed time.

In operation 422, the processor 160 may receive a request for traffic transmission from an App 3 112-3 in course of buffering the traffic of the App 2 112-2. Here, in accordance with an embodiment of the present disclosure, it is assumed that the App 3 112-3 is an aperiodic App 112 not included in a traffic control exception App list.

In operation 424, the processor 160 detects generation of traffic in response to the traffic transmission request. At this time, the processor 160 determines if the corresponding traffic is traffic generated by an App included in the traffic control exception App list or is traffic generated by an App not included in the traffic control exception App list, through the scheduler 162. Here, the processor 160 may determine that the App 3 112-3 is the aperiodic App 112 not included in the traffic control exception App list.

In operation 426, the processor 160 determines a delay allowed time for the traffic of the App 3 112-3 through the scheduler 162. At this time, the scheduler 162 may determine the delay allowed time based on a prediction time of generation of traffic of an App included in the traffic control exception App list and a default session timeout value of an OS. If the delay allowed time is previously set for the App 3 112-3, the scheduler 162 may update the previous delay allowed time in a previously set way as illustrated in FIG. 2A or 2B.

In operation 428, the processor 160 sets a session timeout value to a session of communication between the App 3 112-3 and a server, based on the delay allowed time. Thereafter, in operation 430, the processor 160 notifies the App 3 112-3 that the traffic is not processed and is in a waiting state. In operation 432, the processor 160 buffers the traffic requested for transmission from the App 3 112-3 and delays processing of the traffic.

In operation 434, the processor 160 may detect the expiration of the delay allowed time of the App 2 112-2 from a time point of buffering the traffic of the App 2 112-2. For example, the processor 160 may detect that the processor 160 delays the traffic of the App 2 112-2 as much as the delay allowed time set to the App 2 112-2. Thereafter, in operation 436, the processor 160 determines to transmit the buffered traffic of the App 2 112-2 and App 3 112-3. For instance, because the traffic of the App 2 112-2 has been delayed as much as the delay allowed time set to the App 2 112-2, the processor 160 may judge that it is a situation of being able to no longer delay the traffic of the App 2 112-2, and determine to transmit the traffic of the App 2 112-2. At this time, the processor 160 allows the traffic of the App 3 112-3 that is being buffered at a corresponding time point to be processed together, thereby being capable of obtaining an effect capable of decreasing electric current consumption of the electronic device 100 and a signal load of a network.

In operation 438, the processor 160 transmits the traffic of the App 2 112-2 to the server 190. In operation 440, the processor 160 notifies the App 2 112-2 that the traffic transmission is completed. In addition, in operation 442, the processor 160 transmits the traffic of the App 3 112-3 to the server 190. In operation 444, the processor 160 notifies the App 3 112-3 that THE traffic transmission is completed. Here, the traffic of the App 2 112-2 and the traffic of the App 3 112-3 are transmitted in order through operations 438 and 442 as mentioned above, but the transmission of the traffic of the App 3 112-3 may be started at the same time point as the transmission of the traffic of the App 2 112-2, and may be started between a time point after completion of transmission of the traffic of the App 2 112-2 and a time point before conversion of the electronic device 100 from an active state to an idle state.

Figure 5:
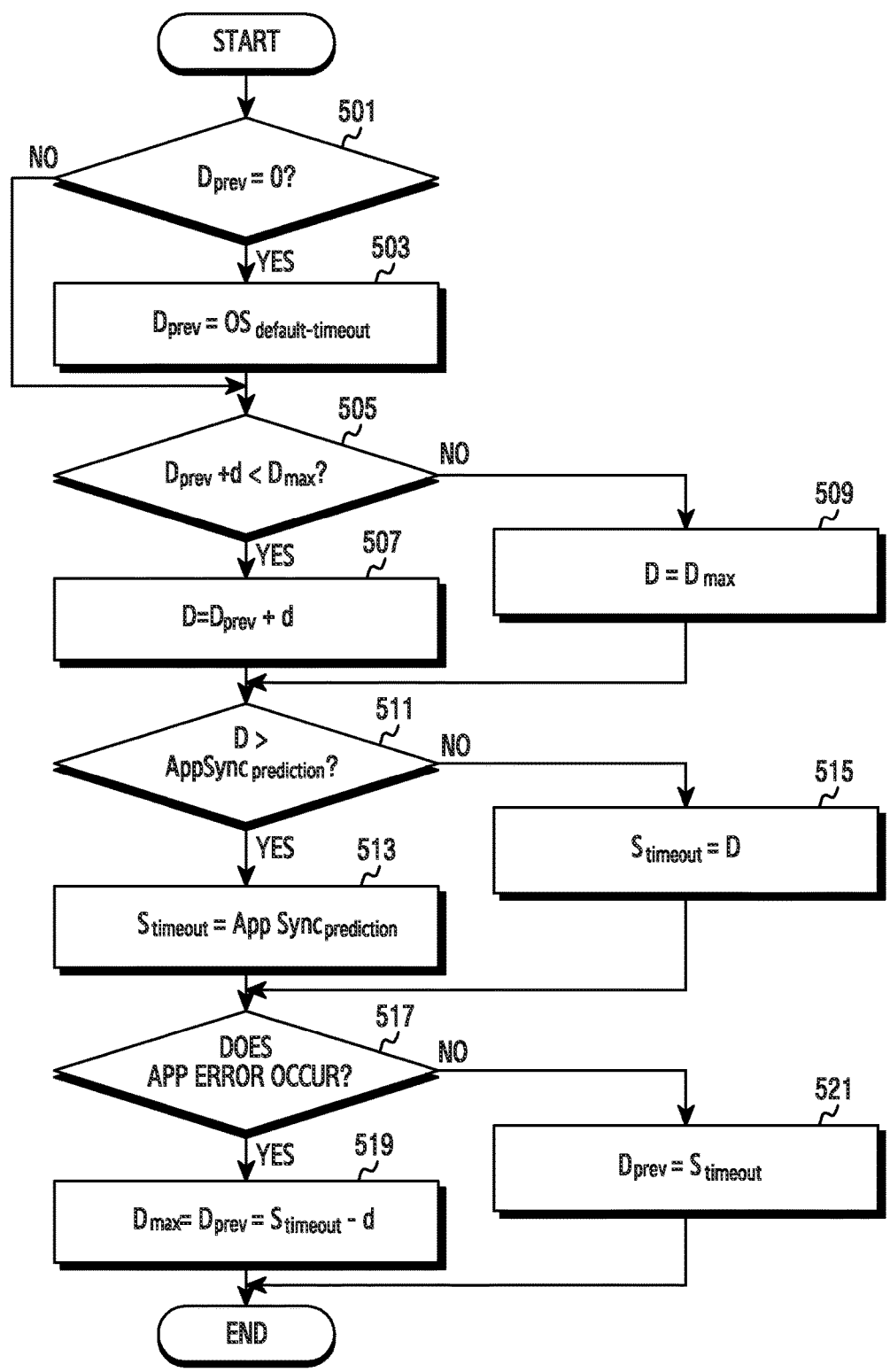
FIG. 5 is a flowchart illustrating a procedure of determining a delay allowed time of aperiodic traffic in an electronic device according to an embodiment of the present disclosure.

FIG. 5 is a flowchart illustrating a procedure of determining a delay allowed time of aperiodic traffic in an electronic device according to an embodiment of the present disclosure.

Here, determining a delay allowed time of a specific App generating aperiodic traffic is described by way of example. In FIG. 5 below, a description is made assuming a case of updating a delay allowed time by adding a previously set time (t) to the delay allowed time as illustrated in FIG. 2B. However, FIG. 5 below may be identically applied even to a case of updating the delay allowed time in a multiple form.

Referring to FIG. 5, in operation 501, the electronic device 100 determines if a delay allowed time ($D_{prev}$) previously set to a specific App is equal to '0'. In accordance with an embodiment of the present disclosure, if traffic has not ever been generated by a specific App, or if traffic has ever been generated by the specific App but traffic control for the specific App has not ever been performed, the previously set delay allowed time ($D_{prev}$) for the specific App may be equal to '0'. If the previously set delay allowed time ($D_{prev}$) is not equal to '0' for the specific App, the electronic device 100 proceeds directly to operation 505 below.

If the previously set delay allowed time ($D_{prev}$) is equal to '0' for the specific App, in operation 503, the electronic device 100 may determine a default timeout value ($OS_{default-timeout}$) set to an OS as the previously set delay allowed time ($D_{prev}$).

In operation 505, the electronic device 100 determines if a value of adding the previously set delay allowed time ($D_{prev}$) and a previously set delta value (d) is less than a maximal delay allowed time ($D_{max}$). Here, the initial maximal delay allowed time ($D_{max}$) may be a traffic generation prediction time ($AppSync_{prediction}$) estimated by the App manager 130 at a corresponding time point. For instance, the traffic generation prediction time ($AppSync_{prediction}$) is fixed not a fixed value, and may be changed in accordance with a time point of performing a process of estimating the delay allowed time in the electronic device 100.

If the value of adding the previously set delay allowed time ($D_{prev}$) and the previously set delta value (d) is less than the maximal delay allowed time ($D_{max}$), the electronic device 100 proceeds to operation 507 and determines as a delay allowed time (D) the value of adding the previously set delay allowed time ($D_{prev}$) and the previously set delta value (d). In contrast, the value of adding the previously set delay allowed time ($D_{prev}$) and the previously set delta value (d) is greater than or is equal to the maximal delay allowed time ($D_{max}$), the electronic device proceeds to operation 509 and determines the maximal delay allowed time ($D_{max}$) as the delay allowed time (D).

In operation 511, the electronic device 100 compares the delay allowed time (D) and the traffic generation prediction time ($AppSync_{prediction}$). If the traffic generation prediction time ($AppSync_{prediction}$) is greater than or is equal to the delay allowed time (D), in operation 515, the electronic device 100 may determine the delay allowed time (D) as a session timeout value ($S_{timeout}$). If the traffic generation prediction time ($AppSync_{prediction}$) is less than the delay allowed time (D), in operation 513, the electronic device 100 may determine the traffic generation prediction time ($AppSync_{prediction}$) as the session timeout value ($S_{timeout}$). For instance, the electronic device 100 may determine a smaller value among the determined delay allowed time (D) and traffic generation prediction time ($AppSync_{prediction}$) as the session timeout value ($S_{timeout}$) for a corresponding App.

In operation 517, the electronic device 100 determines if an error takes place in the corresponding App. For example, the electronic device 100 determines if the error takes place in the corresponding App in course of processing traffic of the corresponding App based on the session timeout value that is set to the corresponding App. If the error does not take place in the corresponding App, in operation 521, the electronic device 100 determines the set session timeout value ($S_{timeout}$) as the previous delay allowance time ($D_{prev}$), and terminates the procedure according to the embodiment of the present disclosure. In contrast, if the error takes place in the corresponding App, in operation 519, the electronic device 100 subtracts the previously set delta value (d) from the set session timeout value ($S_{timeout}$), and determines the subtracted result value ($S_{timeout}-d$) as the previous delay allowance time ($D_{prev}$) and the maximal delay allowance time ($D_{max}$). Thereafter, the electronic device 100 terminates the procedure according to the embodiment of the present disclosure.

Figure 6:
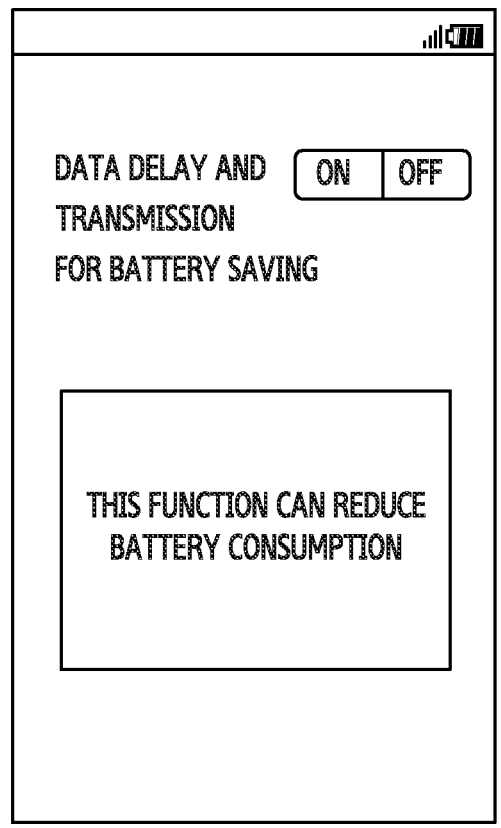
FIG. 6 is a diagram illustrating a screen construction of setting the allowance or non-allowance of delay of aperiodic traffic in an electronic device according to an embodiment of the present disclosure.

FIG. 6 is a diagram illustrating a screen construction of setting the allowance or non-allowance of delay of aperiodic traffic in an electronic device according to an embodiment of the present disclosure.

Referring to FIG. 6, the electronic device 100 according to the embodiment of the present disclosure may provide a user interface of requesting for setting whether to delay and transmit traffic for the purpose of battery saving at data use. In accordance with an embodiment of the present disclosure, if a user allows delaying and transmitting traffic, the electronic device 100 may perform the aforementioned operations as illustrated in FIGS. 1 to 5.

The present disclosure has an effect of, after setting a traffic delay allowed time not causing a timeout error for each application, delaying processing of aperiodic traffic based on the set traffic delay allowed time, and controlling to process the delayed aperiodic traffic together at the time of periodic traffic processing, thereby being capable of decreasing electric current consumption and decreasing a signal load of a network access. More particularly, an embodiment of the present disclosure may control a time point of processing of aperiodic traffic generated in an application whose periodic alarm is not registered to an OS, without modifying the application in an electronic device.

In the aforementioned embodiment of the present disclosure, connecting with a server of an application based on HTTP and processing traffic in an electronic device have been described. However, the aforementioned various embodiments of the present disclosure may be identically applied even to a case of generating a Transmission Control Protocol (TCP) or User Datagram Protocol (UDP) based socket, and connecting with a server of an application based on the TCP or UDP and processing traffic in an electronic device. For example, even when an application directly accesses a socket Application Programming Interface (API) of an OS and connects with a server based on TCP or UDP and processes traffic for communication with the server, the aforementioned various embodiments of the present disclosure may determine a delay allowed time of aperiodic traffic in the same way, and control a time point of processing of the aperiodic traffic based on the determined delay allowed time in the same way.

Although the present disclosure has been shown and described with reference to certain preferred embodiments thereof and the drawings thereof, the present disclosure is not limited to the aforementioned various embodiments of the present disclosure, and various changes and modifications in form and details may be made therein without departing from the spirit and scope of the disclosure by a person having ordinary knowledge in the art to which the present disclosure belongs.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
   processing first traffic associated with a first application based on a first time interval for delaying the first traffic;
   determining a second time interval for delaying second traffic associated with the first application based on whether an error for the processing of the first traffic occurs; and
   processing the second traffic based on the second time interval for delaying the second traffic.

2. The method of claim 1,
wherein at least one of the first time interval and the second time interval is determined based on a time for third traffic associated with a second application to be generated,
wherein the first application is an application not comprised in a traffic control exception application list, and
wherein the second application is an application comprised in the traffic control exception application list.

3. The method of claim 2, wherein the traffic control exception application list comprises at least one application generating traffic by periods.

4. The method of claim 2, wherein the traffic control exception application list comprises at least one application which is selected based on at least one of a network connection state of the electronic device, a type of a network being connecting, battery charging or non-charging, battery level information, information of an application being operating in a background, information of an application being operating in a foreground, and a user input.

5. The method of claim 2, wherein the determining of the second time interval comprises:
estimating a prediction time of generation of the third traffic associated with the second application comprised in the traffic control exception application list; and
determining the second time interval based on the prediction time and a session timeout value previously set to the electronic device.

6. The method of claim 1, wherein the processing of the first traffic associated with the first application comprises setting the first time interval as a timeout value of a session for connection between the first application and a server.

7. The method of claim 1, wherein the determining of the second time interval for delaying the second traffic associated with the first application based on whether the error for the processing of the first traffic occurs comprises:
updating the first time interval to the second time interval when the error for the processing of the first traffic has not occurred.

8. The method of claim 7, wherein the updating of the first time interval to the second time interval comprises:
increasing the first time interval;
setting the second time interval as one of the increased first time interval and a prediction time of generation of third traffic associated with the second application comprised in a traffic control exception application list; and
setting the second time interval as a timeout value of a session for connection between the first application and a server.

9. The method of claim 1, wherein the processing of the first traffic associated with the first application comprises:
delaying the processing of the first traffic based on the first time interval;
detecting whether third traffic associated with a second application is generated in a state of delaying of the processing of the first traffic; and
concurrently processing, when the third traffic associated with the second application is generated, the third traffic and the first traffic.

10. The method of claim 1, wherein the processing of the first traffic associated with the first application comprises:
delaying the processing of the first traffic based on the first time interval;
detecting whether third traffic associated with a second application is generated before the first interval expires in a state of delaying the processing of the first traffic; and
processing, when the third traffic associated with the second application is not generated before the first time interval expires, the first traffic at a time point of expiration of the first time interval.

11. An apparatus of an electronic device, the apparatus comprising:
at least one transceiver; and
at least one processor, operatively coupled to the at least one transceiver, configured to:
process first traffic associated with a first application based on a first time interval for delaying the first traffic,
determine a second time interval for delaying second traffic associated with the first application based on whether an error for the processing of the first traffic occurs, and
process the second traffic based on the second time interval for delaying the second traffic.

12. The apparatus of claim 11,
wherein at least one of the first time interval and the second time interval is determined based on a time for third traffic associated with a second application to be generated,
wherein the first application is an application not comprised in a traffic control exception application list, and
wherein the second application is an application comprised in the traffic control exception application list.

13. The apparatus of claim 12, wherein the traffic control exception application list comprises at least one application generating traffic by periods.

14. The apparatus of claim 12, wherein the traffic control exception application list comprises at least one application which is selected based on at least one of a network connection state of the electronic device, a type of a network being connecting, battery charging or non-charging, battery level information, information of an application being operating in a background, information of an application being operating in a foreground, and a user input.

15. The apparatus of claim 12, wherein the at least one processor is further configured to:
estimate a prediction time of generation of the third traffic associated with the second application comprised in the traffic control exception application list; and
determine the second time interval based on the prediction time and a session timeout value previously set to the electronic device.

16. The apparatus of claim 11, wherein the at least one processor is further configured to set the first time interval as a timeout value of a session for connection between the first application and a server.

17. The apparatus of claim 11, wherein the at least one processor is further configured to:
update the first time interval to the second time interval when the error for the processing of the first traffic has not occurred.

18. The apparatus of claim 17, wherein, when the error of the first application takes place, the at least one processor is further configured to:
increase the first time interval;
set the second time interval as one of the increased first time interval and a prediction time of generation of third traffic associated with the second application comprised in a traffic control exception application list; and set the second time interval as a timeout value of a session for connection between the first application and a server.

19. The apparatus of claim 11, wherein the at least one processor is further configured to:

delay the processing of the first traffic based on the first time interval;

detect whether third traffic associated with a second application is generated in a state of delaying of the processing of the first traffic; and concurrently process, when the third traffic associated with the second application is generated, the third traffic and the first traffic.

20. The apparatus of claim 11, wherein the at least one processor is further configured to:

delay the processing of the first traffic based on the first time interval;

detect whether third traffic associated with a second application is generated before the first interval expires in a state of delaying the processing of the first traffic; and process, when the third traffic associated with the second application is not generated before the first time interval expires, the first traffic at a time point of expiration of the first time interval.

* * * * *